United States Patent [19]

Allison et al.

[11] Patent Number: 4,773,481
[45] Date of Patent: Sep. 27, 1988

[54] REDUCING PERMEABILITY OF HIGHLY PERMEABLE ZONES IN UNDERGROUND FORMATIONS

[75] Inventors: Joe D. Allison; Jerry D. Purkaple, both of Ponca City, Okla.

[73] Assignee: Conoco Inc., Ponca City, Okla.

[21] Appl. No.: 56,197

[22] Filed: Jun. 1, 1987

[51] Int. Cl.⁴ .......................................... E21B 33/138
[52] U.S. Cl. .................................. 166/270; 166/295; 166/300; 523/130
[58] Field of Search ............. 166/270, 281, 294, 295, 166/300; 405/264; 523/130, 132

[56] References Cited

U.S. PATENT DOCUMENTS

| | | | |
|---|---|---|---|
| 3,491,049 | 1/1970 | Gibson et al. | 166/295 X |
| 3,762,476 | 10/1973 | Gall | 166/295 X |
| 3,799,262 | 3/1974 | Knight | 166/294 X |
| 3,805,893 | 4/1974 | Sarem | 166/270 |
| 3,857,443 | 12/1974 | Cole | 166/295 |
| 3,949,811 | 4/1976 | Threlkeld et al. | 166/270 X |

OTHER PUBLICATIONS

*Chemical Abstracts*, vol. 77, 1972, p. 63, Abstract No. 153422D, Zweigle, Maurice Laverne, "Acrylamide Polymer Gel Compositions".

*Primary Examiner*—George A. Suchfield

[57] ABSTRACT

High permeability zones in subterranean formations are reduced in permeability by the gelation of water soluble polymers of polyalkylenimines, polyalkylenepolyamines and mixtures thereof is such formations with nonionic polymers which are hydrolyzable to anionic polymers which are capable of cross-linking with and gelling said water soluble polymers.

12 Claims, 1 Drawing Sheet

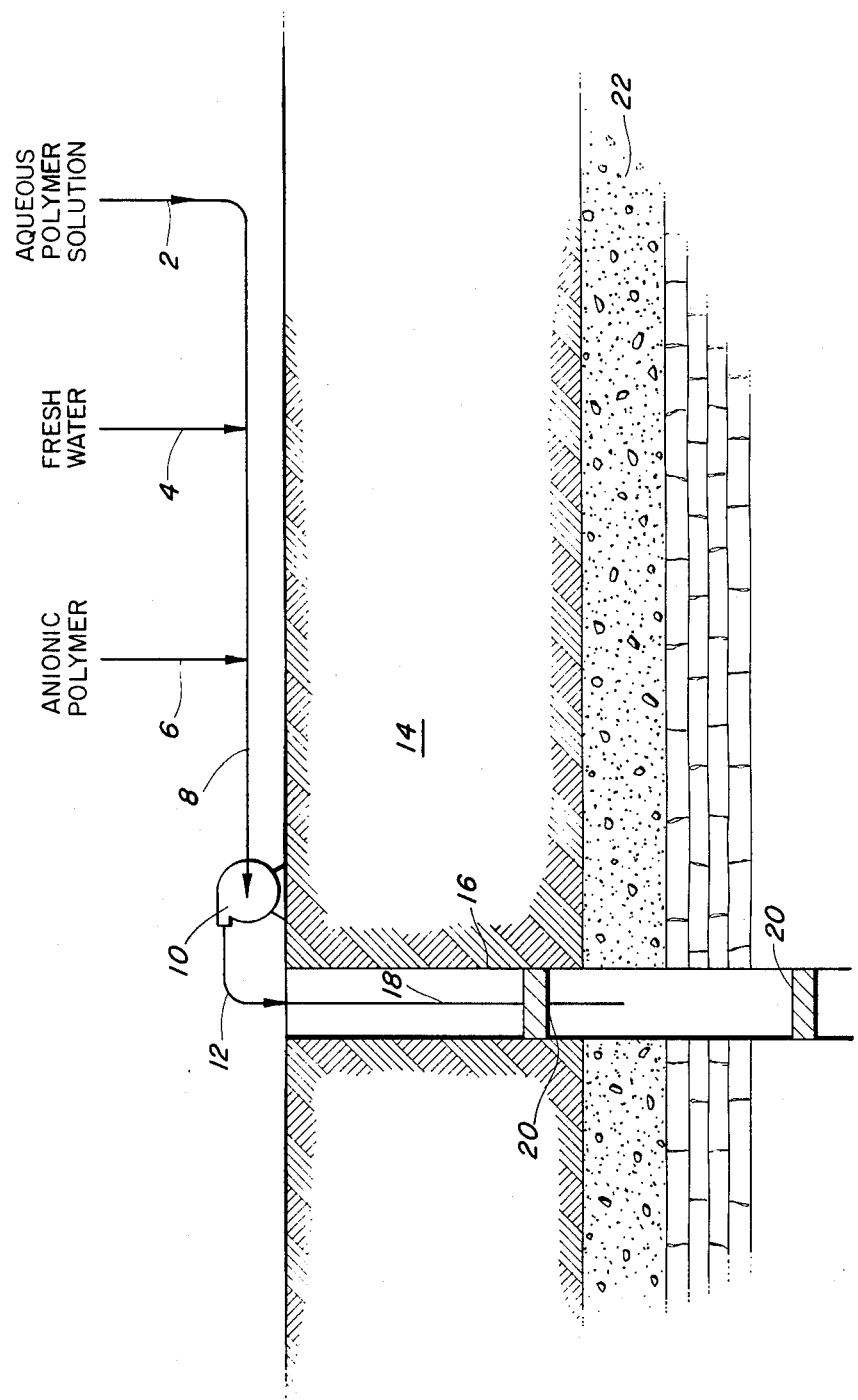

REDUCING PERMEABILITY OF HIGHLY PERMEABLE ZONES IN UNDERGROUND FORMATIONS

BACKGROUND AND SUMMARY OF THE INVENTION

The problem of fluid loss to highly porous underground formations penetrated by a well has, of course, been long recognized. These highly permeable zones are often called thief zones. In water or steam stimulation operations, for example, a serious problem is often encountered because a very small interval of the total production zone may be taking 80 percent or more of the total injected fluid. When this happens, the benefit of the injection project may be lost or greatly reduced.

An isolated high-permeability zone or fracture can be plugged at the well bore face by a shallow layer of applied cement, though such a permanent, relatively irrevocable technique often is undesirable. More desirably, a communicating high-permeability zone is plugged to some considerable depth in order to prevent flood water from otherwise merely flowing around a narrow shallow plug and back into the high-permeability or swept zone. Indepth plugging of a relatively high-permeability zone converts the zone into a much lower permeability zone. Then, subsequently injecting flood water or other fluid will tend to enter the formerly by-passed, but now relatively more permeable hydrocarbon-bearing zones and thus mobilize increased amounts of hydrocarbons therefrom.

Various methods have been used in the past to achieve indepth gelling, such as gelable systems triggered by a following aqueous acidic solution injection for subsequent pH adjustment. However, injecting an acidic solution following the polymer solution may result in gelation occurring so rapidly that a sufficient indepth plugging is not effectively obtained in the most permeable strata where desired. In another method, water, a polymer and a cross-linking agent capable of gelling the polymer such as a sequestered polyvalent metal cation, are admixed, and, just before injection into an underground formation, an acid is added thereto to effect gelation. But, when the acid is pre-mixed with the gelable composition, the gelation can be too fast, making it necessary to shear the gelled polymer in order to be able to obtain adequate injection, which reduces effectiveness of the gel.

Indepth gelling has also been effected by the controlled gelation of sodium silicate. Also, polymers have previously been gelled in permeable zones by borate ions supplied in various ways.

According to this invention, permeability of a highly permeable zone in a subterranean formation is reduced by introducing into the formation, an aqueous solution of a water soluble polymer selected from the group consisting of polyalkylenimines and polyalkylenepolyamines and mixtures thereof and a nonionic polymer which is hydrolyzable to an anionic polymer which is capable of cross-linking with and gelling said water soluble polymers. In one aspect of the invention the nonionic polymer is hydrolyzed prior to introduction into the subterranean formation. The resulting anionic polymer and water soluble polymer are then separately introduced into the formation.

PRIOR ART

U.S. Pat. No. 3,491,049 discloses an aqueous hydraulic cement containing an anionic surface active agent, an amino compound such as polyalkylenimine, and water. The cement slurry is useful as a fluid loss additive.

Chem Abstracts 77-153422d (1972) discloses acrylamide polymer gel containing N-N'-methylenediacrylamide, partially hydrolyzed polyacrylamide, and polyethylenimine. The gel is useful for extinguishing wood fires and manufacture of cellulose laminates.

BRIEF DESCRIPTION OF THE DRAWING

The drawing is a schematic flow diagram (partially in cross-section) of an apparatus arrangement which illustrates the method for carrying out the invention.

DETAILED DESCRIPTION OF THE INVENTION

Referring now to the drawing, there is provided a well bore 16 penetrating an earth formation 14 and a streak or zone 22 of high permeability. Well 16 is preferably provided with packing means 20 to isolate zone 22. An aqueous solution of polymer, such as polyethylenimine, is introduced through lines 2 and 8, passing through pump 10 and line 12 into well bore 16. The polymer entering the well passes downwardly through tubing string 18 and enters formation 22. The cationic characteristics of this material cause it to be adsorbed onto the formation rock.

Waterflood water (usually formation water) is then injected into the formation in a similar manner via line 4. The water serves to clean the well bore and the adjacent formation of polyethylenimine to prevent premature gelling in these locations upon introduction of the gelling agent. In the next step, an anionic polymer which is capable of cross-linking with and gelling the polyethylenimine such as hydrolyzed polyacrylamide is injected into the formation in a corresponding manner through line 6. The polyacrylamide reacts with the adsorbed polyethylenimine and leaves additional reactive groups open for further reaction. A second water injection is then carried out via line 4. Finally, additional polyethylenimine is injected through line 2. This material reacts with the open reactive groups of the polyacrylamide in the formation to form a cross-linked gel system. If desired, the foregoing steps can be repeated to obtain any desired degree of permeability reduction. Thus, in a water flood operation where zone 22 has previously passed a major portion of the fluids injected into the formation, these fluids are now forced into other zones which contain oil thereby increasing the production of oil from the formation.

In the procedure illustrated by the drawing, the cross-linking and water soluble polymers are separately introduced into the subterranean formation. However, these materials may be combined outside the formation if certain precautions (discussed later) are observed.

The water soluble polymers which are used in the practice of the invention are selected from the group consisting of polyalkylenimines, polyalkylenepolyamines and mixtures thereof. The preferred polyalkylenepolyamines are the polymeric condensates of lower molecular weight polyalkylenepolyamines and a vicinal dihaloalkane. The polyalkylenimines are best illustrated by polymerized ethylenimine or propylenimine. The polyalkylenepolyamines are exemplified by polyethylene and polypropylenepolyamines.

The above described water soluble polymers are generally used in this invention in amounts of about 0.1% to 50% by weight based upon the weight of the polymer and water combination and preferably in amounts between about 2% and about 6%.

Additional details concerning these polymers and their method of preparation may be found in U.S. Pat. No. 3,491,049 which is hereby incorporated by reference.

Any anionic polymers or nonionic polymers which are hydrolyzable to anionic polymers which are capable of reacting with and cross-linking the above described water soluble polymers may be used in the process of the invention. Included are such compounds as polyacrylamide and alkylpolyacrylamides, copolymers of polyacrylamide and alkylpolyacrylamides with ethylene, propylene and styrene, polymaleic anhydride and polymethacrylate and the hydrolysis products thereof. These compounds and their reactions with the amine groups of the polyalkylenimine and polyalkylenepolyamine polymers are illustrated by the following reactions:

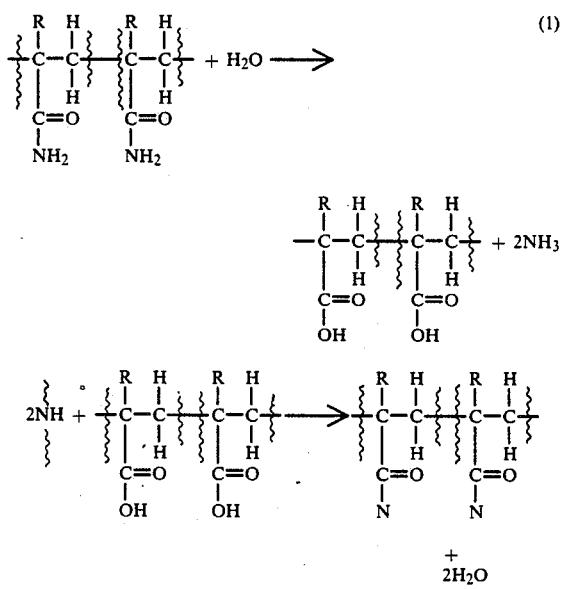

Where R is hydrogen or straight or branched chain alkyl containing 1 to 4 carbon atoms.

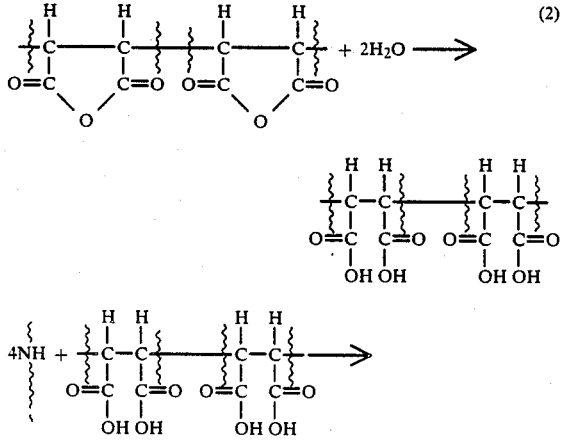

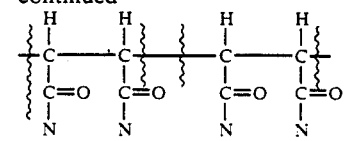

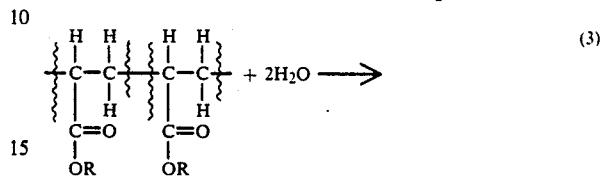

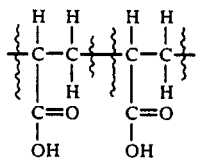

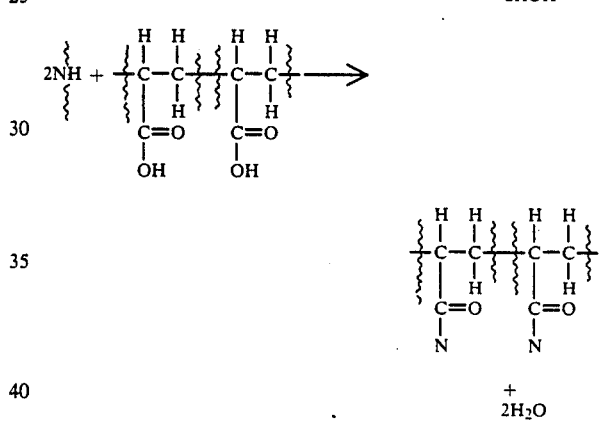

The nonionic polymers used in the method of the invention must be hydrolyzed to provide reactive groups which are capable of cross-linking and gelling the water soluble polymers. Some nonionics need only be contacted with water to effect immediate hydrolysis. Others require an extended period of contact and/or heating or agitation in order to effect hydrolysis in a reasonable period of time. Since the water soluble polymer is used in an aqueous solution an appropriate selection of nonionic polymer must be made to prevent hydrolysis and premature gelling if the two materials are introduced together into the subterranean formation. Also a water carrier is normally provided for the nonionic polymer. Both the water and heat necessary for hydrolysis of nonionic polymers are ordinarily found within the formation to be treated.

The cross-linking polymers can be used in amounts from about 0.1 percent to about 100 percent by weight of the water soluble polymer, but preferably are employed in amounts between about 5 percent and about 20 percent by weight. The water carrier for the cross-linking polymers is usually present in an amount to provide a polymer concentration of between about 3 percent and about 6 percent by weight.

The reactivity of the cross-linking polymers and the water soluble polymers will vary widely depending on the amounts and the particular materials used. For example, hydrolyzed polyacrylamide, even in very small quantities, cross-links with polyethylenimine almost immediately. Other cross-linking polymers are much slower to react. When the reactivity of the materials used in carrying out the invention is such that they cannot be combined outside the formation to be treated without premature cross-linking, which is generally the case with the anionic polymers, the procedure described above with reference to the drawing is followed.

The volume of material (water soluble polymer and cross-linking polymer) injected in the zone of high permeability to be treated is determined by the size of the zone. Typically, volumes from about 5 to about 100 percent of the pore volume of the zone to be treated are used. Once the amount of material to be injected has been determined and the injection rate has been set, the treatment time can then be estimated. If the water soluble polymer and cross-linking polymer are to be injected into the formation together, they are then selected to provide a material which is stable for the amount of time equal to the required treatment time.

The following example illustrates the results obtained in carrying out the invention:

EXAMPLE 1

A 2.5 percent solution of polyethylenimine in deionized water was mixed with a 0.1 percent solution of polyacrylamide in deionized water at room temperature. Upon mixing, the two solutions quickly formed a viscous gel.

EXAMPLE 2

In a waterflood of an oil-bearing formation, salt water is injected for eight months. At the end of this time, the well is logged and it is found that eighty percent of the injection water is being lost into a thief zone.

One thousand five hundred barrels of a mixture of an aqueous solution of polyethylenepolyamine and polymaleic anhydride (5 wt%) are introduced into the injection well over a period of twenty four hours. Upon completion of the injection, that portion of the mixture remainig in the well bore is displaced into the formation with waterflood water.

Within thirty six hours after injection, the polymaleic anhydride hydrolyzes and reacts with and cross-links the polyethylenepolyamine to form a gel, thereby plugging the entire thief zone.

Upon logging the injection well a second time, it is determined that the thief zone is now taking only fifteen percent of the injection water. Thus, the permeability of the thief zone is substantially reduced by the method of the invention.

I claim:

1. A process for reducing flow into a porous thief zone penetrated by a water injection well bore which comprises injecting down said well bore and into said porous thief zone a mixture of an aqueous solution of a water soluble polymer selected from the group consisting of polyalkylenimines, polyalkylenepolyamines and mixtures thereof and an anionic or hydrolyzable nonionic polymer capable of delayed cross-linking with said water soluble polymer whereby delayed indepth gelling of the water soluble polymer takes place in the formation, said anionic or nonionic polymer being selected from the group consisting of polyacrylamide and alkylpolyacrylamides, copolymers of polyacrylamide and alkylpolyacrylamides with ethylene, propylene and styrene, polymaleic anhydride and polymethacrylate and hydrolysis products thereof.

2. The process of claim 1 in which the water soluble polymer is a polyalkyleninime.

3. The process of claim 1 in which the anionic or nonionic polymer is polyacrylamide and the water soluble polymer is polyethylenimine.

4. A process for reducing the permeability of a subterranean formation traversed by a well bore which comprises:
    (a) injecting into the formation via the well bore an aqueous solution of a water soluble polymer selected from the group consisting of polyalkylenimines, polyalkylenepolyamines and mixtures thereof,
    (b) injecting water into the formation,
    (c) injecting into the formation an anionic or hydrolyzable nonionic polymer capable of cross-linking with said water soluble polymer,
    (d) injecting water into the formation,
    (e) injecting into the formation a further amount of said water soluble polymer solution whereby indepth gelling of the water soluble polymer takes place in the formation.

5. The process of claim 4 in which the water soluble polymer is a polyalkylenimine.

6. The process of claim 5 in which the anionic or nonionic polymer is selected from the group consisting of polyacrylamide and alkylpolyacrylamides, copolymers of polyacrylamide and alkylpolyacrylamides with ethylene, propylene and styrene, polymaleic anhydride and polymethacrylate and hydrolysis products thereof.

7. The process of claim 6 in which the cross-linking agent is hydrolyzed polyacrylamide and the water soluble polymer is polyethyleneimine.

8. The process of claim 7 being repeated a sufficient number of times to attain a desired permeability reduction.

9. A process for reducing the permeability of a subterranean formation traversed by a well bore which comprises introducing into the formation via the well bore an aqueous solution of a water soluble polymer selected from the group consisting of polyalkylenimines, polyalkylenepolyamines and mixtures thereof and an anionic or hydrolyzable nonionic polymer selected from the group consisting of polyacrylamide and alkylpolyacrylamides, copolymers of polyacrylamide and alkylpolyacrylamides with ethylene, propylene and styrene, polymaleic anhydride and polymethacrylate and hydrolysis products thereof and capable of delayed cross-linking with said water soluble polymer whereby delayed indepth gelling of the water soluble polymer takes place in the formation.

10. The process of claim 9 in which the water soluble polymer is a polyalkylenimine.

11. A process for reducing the permeability of a subterranean formation traversed by a well bore which comprises introducing into the formation via the well bore an aqueous solution of polyethylenimine and an anionic or hydrolyzable nonionic polymer capable of delayed cross-linking with said polyethylenimine whereby delayed indepth gelling of the polyethylenimine takes place in the formation.

12. A process for reducing the permeability of a subterranean formation traversed by a well bore which comprises introducing into the formation via the well bore an aqueous solution of a water soluble polyalkylenepolyamine and an anionic or hydrolyzable nonionic polymer capable of delayed cross-linking with said polyalkylenepolyamine whereby delayed indepth gelling of the polyalkylenepolyamine takes place in the formation.

* * * * *